United States Patent [19]
Gotoda et al.

[11] 3,869,341
[45] Mar. 4, 1975

[54] PLYWOOD COMPRISING IONIZING RADIATION CURED CROSS-LINKED DIALLYL PHTHALATE ACRYLONITRILE POLYMER AND METHOD OF MAKING

[75] Inventors: Masao Gotoda; Kenji Yokoyama, both of Osaka; Yoshimi Kono, Amagasaki; Shigekazu Toyonishi, Osaka; Kunio Hiwano; Takaitsu Shimoyama, both of Hiroshima, all of Japan

[73] Assignee: Japan Atomic Energy Research Institute, Minato-ku, Tokyo, Japan

[22] Filed: Apr. 3, 1972

[21] Appl. No.: 240,862

Related U.S. Application Data

[62] Division of Ser. No. 35,644, May 8, 1970, abandoned.

[30] Foreign Application Priority Data

May 9, 1969 Japan.............................. 44-35236

[52] U.S. Cl............... 161/270, 117/93.31, 156/272, 161/412, 204/159.12
[51] Int. Cl......... B32b 21/04, B05c 5/00, B01j 1/10
[58] Field of Search.......... 156/272; 117/93.31, 148; 204/159.12, 159.15; 161/412, 268, 270

[56] References Cited
UNITED STATES PATENTS

| | | | |
|---|---|---|---|
| 3,081,244 | 3/1963 | Campanile.......................... | 156/272 |
| 3,480,506 | 11/1969 | Hart et al............................ | 156/272 |
| 3,511,687 | 5/1970 | Keyl et al.......................... | 117/93.31 |
| 3,607,355 | 9/1971 | Loeb.................................. | 117/93.31 |
| 3,616,028 | 10/1971 | Miller ................................ | 156/272 |
| 3,652,356 | 3/1972 | Van Gasse et al.................. | 156/272 |
| 3,663,261 | 5/1972 | Miettinen.......................... | 117/93.31 |
| 3,676,283 | 7/1972 | Kehr et al........................... | 161/412 |

Primary Examiner—Douglas J. Drummond
Attorney, Agent, or Firm—Stevens, Davis, Miller & Mosher

[57] ABSTRACT

A composition substantially comprising diallylphthalate prepolymer and acrylonitrile or a mixture of acrylonitrile and an alkylacrylate is cured by means of an electron beam as well as other ionizing radiations to form a cross-linked resin having excellent properties. A vinyl phosphate incorporated in the composition makes the cured coating anticorrosive and adhesive to metal surface. The composition is useful as a coating of adhesion agent, or for the manufacture of decorative plywood, colored coiled steel sheet, etc., and for preparing an anticorrosive paint.

12 Claims, 1 Drawing Figure

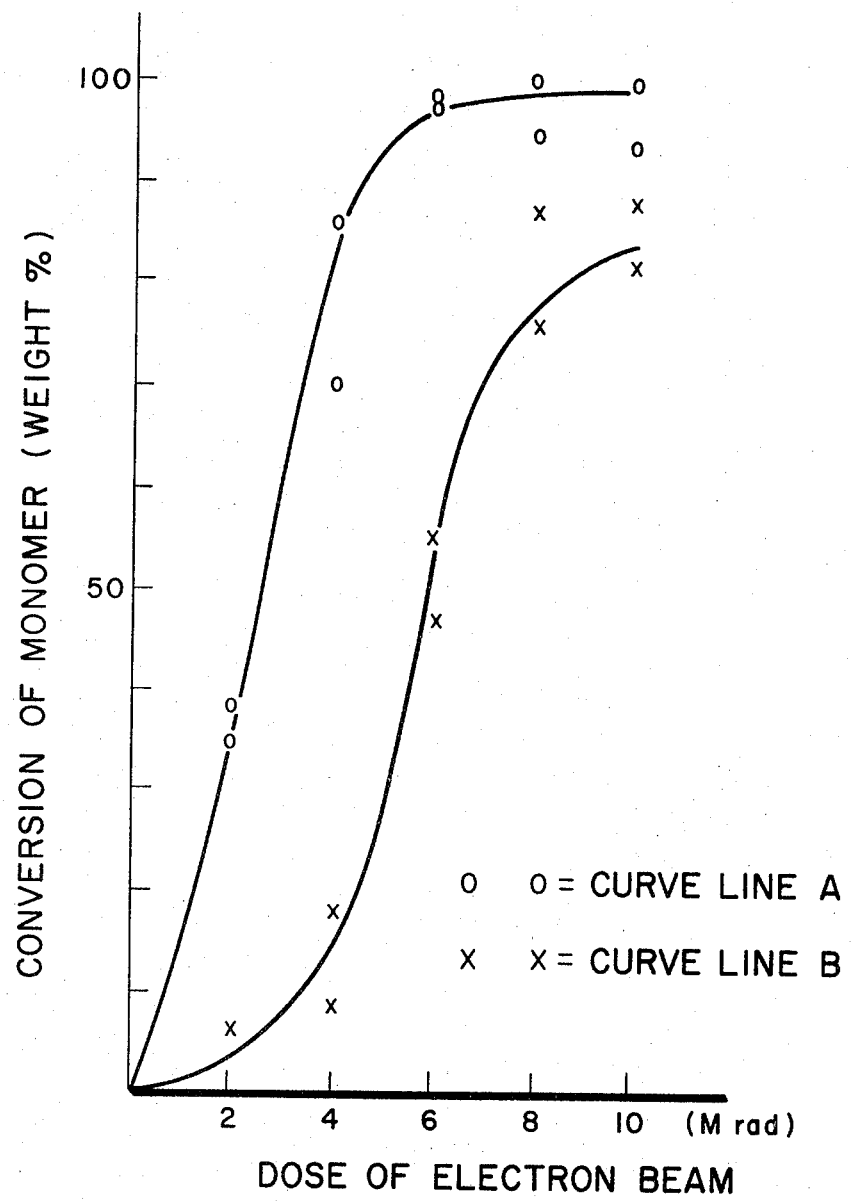

PLYWOOD COMPRISING IONIZING RADIATION CURED CROSS-LINKED DIALLYL PHTHALATE ACRYLONITRILE POLYMER AND METHOD OF MAKING

This is a division of application Ser. No. 35,644, filed May 8, 1970 now abandoned.

CROSS-REFERENCE TO RELATED APPLICATION

This invention is based on the invention titled "A process for curing synthetic resin composition by means of ionizing radiation" filed on Jan. 19, 1970, now abandoned, application Ser. No. 4,093 being assigned. Said invention relates to a process for preparing a cross-linked polymer which comprises curing a mixture of diallylphthalate prepolymer and a polymerizable vinyl monomer by means of an ionizing radiation. The present invention is a further development of said prior invention, and employs a polymerizalbe monomer comprising acrylonitrile or a mixture of acrylonitrile and an alkylacrylate as the vinyl monomer component and the resulting product can be advantageously used as a coating or a bonding agent or in the manufacture of decorative plywood, etc.

BACKGROUND OF THE INVENTION

Radiation-curable resin-forming compositions, such as unsaturated polyesters dissolved in a vinyl monomer such as styrene, are known. However, these resin materials shrink too much upon curing and, also, they are inferior in resistance to water and chemials and in electrical properties, because they retain residual functional groups such as hydroxyl, carboxyl at the ends of their molecular structure.

The main features of this invention and said prior invention lie in employment or selection of diallylphthalate prepolymer which eliminates the above-mentioned defects and disadvantage of the known resin-forming compositions.

The polymerization (curing) of diallylphthalate resin ordinarily requires rather drastic conditions, such as hot pressing, because of the degradative chain transfer which is intrinsic to allyl compounds. Diallylphthalate prepolymer usually has the straight chain structure comprising 30–50 units, in which concentration of the residual allyl double bond is high. However, it shrinks very little during curing, and it gives a hard polymer body having densely distributed cross-linkings which has excellent dimensional stability. Further, this material is free from the residual functional groups such hydroxyl and/or carboxyl, etc. It is not only superior to unsaturated polyester materials in resistance to water and chemicals, but also it has good weathering resistance and it is superior in electrical properties.

An unsaturated polyester material contains residual functional groups and the double bonds in its main chain are derived from maleic acid etc. In contrast, in the main chain of diallylphthalate prepolymer, there exists no functional group, and the curing reaction depends solely upon graft polymerization by cross-linking of the allyl double bonds remaining in the branches and the vinyl monomer. The difference in the structure of the main chain between the unsaturated polyester and diallylphthalate prepolymer accounts for the latter's stabilizing the cured resin, and making it resistant to weathering. It is a cause of the excellence of the resin composition of this invention. That is, the polymer obtained by the process of this invention retains the qualities of the diallylphthalate which give it superior resistance to weathering, water and chemicals, and give it dimensional stability and excellent electrical properties.

SUMMARY OF THE INVENTION

This invention relates to a composition of a cross-linked polymer material, the method for curing the composition and the use of said composition. More particularly, this invention relates to a cross-linkable polymerizable composition comprising diallylphthalate prepolymer dissolved in acrylonitrile or a mixture of acrylonitrile and an alkylacrylate, if desired together with another vinyl monomer, containing a reaction promoter such as radical initiator if desired, which is polymerized (cured) by means of an ionizing radiation, preferably by an electron beam irradiation, and relates to processes for coating, adhesion and manufacturing decorative laminate plywoods, etc. using said composition and, further, to the products thereof.

Though diallylphthalate prepolymer is easily obtained, it is difficult to polymerize diallylphthalate to higher degree, since a degradative chain transfer takes place during its polymerization. The diallylphthalate prepolymer used in the invention of this application is obtained by polymerizing diallylphthalate by the conventional method, stopping the polymerization before gelling takes place and separating the unreacted monomer. The degree of polymerization of the prepolymer for use in this invention is not strictly limited, but a prepolymer having softening point in the range of 50°–110°C, iodine value in the range of 45–65, viscosity (as 50% methyl ethyl ketone solution) in the range of 35–110 cp (30°C) is preferable.

Also, the proportion in mixing diallylphthalate prepolymer and the vinyl monomer is not restricted. However, hardening is retarded as the concentration of vinyl monomer increases, and therefore, the proportion of vinyl monomer is most suitable for use in the range of 30–70 by weight of the mixture.

The resin-forming composition of this invention can be cured by various ionizing radiations, but one feature of this invention is that the composition is curable by a radiation of high dose rate (e.g., an electron beam from a high power accelerator) and, therefore, curing is effected in an extremely short period of time. This is a great advantage in industry, especially in such fields as the manufacture of plywood and the continuous coating of coiled steel sheets. Incidentally, radical catalysts (free radical initiators) such as benzoyl peroxide can be added to the resin-forming mixture to reduce the radiation dose and increase the degree of curing.

The curing is satisfactorily effected when irradiation is carried out in air, but the radiation dose can be reduced further if the irradiation is carried out in an inert gas such as nitrogen or in an atmosphere maintained a low oxygen concentration.

When a small amount of a phosphate having a reactive vinyl group or groups is added to the above resin-forming composition, the adhesion and anticorrosive properties of the cured coating thereof are remarkably improved.

Some of the preferred modes of practice of this invention are summarized below:

A. According to one embodiment of this invention, a resin-forming composition comprising diallylphthalate prepolymer, acrylonitrile and an alkylacrylate is provided. This composition provides a decorative coating that has excellent resistance to chemicals and solvents, resistance to heat, adequate hardness, and beautiful lustre. As a coating for metallic materials, it has excellent adhesion and suitable flexibility. Futher, it can be used in the manufacture of wood-polymer composites (WPC).

This composition is cured by means of an ionizing radiation, and if desired, a radical catalyst such as benzoyl peroxide can be incorporated in the composition. Because it employs acrylonitrile, the cost of this composition is relatively low. The composition is curable by means of an ionizing radiation, and high speed continuous curing processing is possible by employing an electron accelerator with low voltage and high current intensity. The excellent resistance to solvents characteristic of diallylphthalate prepolymer and polyacrylonitrile is retained in the cured resin obtained from this composition by irradiation, and further the dimensional stability and resistance against weathering characteristic of diallylphthalate resin are retained and its electrical properties are excellent, too.

The thus formed resin is superior as a coating for metal surfaces. Most conventional coating materials are a solution or emulsion of vehicle and pigment, and the coating is formed simply by evaporating the solvent or dispersion medium. Some materials are comprised of two liquid components, which harden when united. In the composition in accordance with this invention, the reactive monomers used as the solvent participate in the curing reaction; they contribute to formation of the coating film and their conversion is about 100%.

In the prior art, it was known that modifying alkyd resin with acrylonitrile improved resistance of the resin to oil and solvents. However, if too much acrylonitrile is used, the product gels and no resin is obtained, so reportedly, no more than 6% of acrylonitrile can be used in the modification. In contrast, in this invention, acrylonitrile is used in combination with diallylphthalate prepolymer as the solvent for the latter before the stage of polymerization, and therefore enough acrylonitrile to dissolve the prepolymer can be used without causing gelling and the properties characteristic of polyacrylonitrile and fully exhibited in the obtained resin.

Because of its excellent adhesive nature, this resin-forming composition can advantageously be used for coating metal surfaces. But the resin derived from the diallylphthalate prepolymer acrylonitrile system lacks flexibility and therefore it is not suitable for a coating in which flexibility is required, such as coating for coiled steel sheets. We have found that a flexible coating with the same adhesion power is obtained by adding to this resin-forming system a polymerizable monomer, such as alkylacrylate, that forms a polymer which has a low second order transition point. The thus obtained metal coating is provided with excellent resistance to chemicals, oils and weathering and also has the self-fire-extinguishing nature inherent to diallylphthalate resin.

Further the resin-forming composition of this embodiment can be very advantageously applied to manufacturing wood-polymer composite, the so-called WPC. Among the methods for manufacturing WPC known so far is the impregnating of wood with a reactive monomer such as methyl methacrylate, then polymerizing said monomer by heating or gamma radiation (that is from a Co-60 source). However, this method is not so efficient, and the resin formed is thermoplastic and therefore is inferior in resistance to heat, chemicals and solvents. In contrast, the resin-forming composition of this invention can be cured in the tissue of wood not only by gamma radiation but also by electron beam, and therefore WPC can be manufactured in a short period of time and continuously within the penetration range of an electron beam. As the thus obtained resin is three-dimensionally cross-linked, the manufactured WPC has excellent dimensional stability as well as resistance to water, chemicals, solvents and weathering.

The proportions of components for the resin-forming compositions in accordance with this embodiments of the invention are as follows:

| Use | $DAP_p$ | AN | AA | BPO |
| --- | --- | --- | --- | --- |
| Decorative board | 100 | 120 – 60 | 0 – 40 | 0 – 8 |
| Coating of metal surface | 100 | 1 – 20 | 120 – 80 | 0 – 8 |
| WPC | 100 | 120 – 60 | 0 – 40 | 0 – 8 | wherein $DAP_p$ stands for diallylphthalate prepolymer, AN for acrylonitrile, AA for alkylacrylate and BPO for benzoyl peroxide. The numbers denote weight ratio. Alkylacrylate, the alkyl group of which has one to five carbon atoms, can easily be used. When a relatively hard coating is desired, an acrylate having a lower alkyl group such as methyl or ethyl is preferred, and when flexibility is required, an acrylate having higher alkyl group containing more than three carbon atoms is preferred.

In curing the resin-forming composition in accordance with this embodiment, it is effective to carry out polymerization in an oxygen-free environment, e.g., in a nitrogen stream or while the surface of the coated composition is covered by a film or sheet. Also, if a radical catalyst, such as benzoyl peroxide is added to the composition, the radiation dose can be reduced.

B. According to another embodiment of this invention, a novel plywood material and a novel method for manufacturing the same is provided. The novel plywood comprises a thin wooden surface layer (veneer) comprising wood polymer composite (WPC) and a substrate component, and the finished product is useful as a material for floor, wall, cabinets, etc. The method of manufacturing it is characterized by carrying out preparing the WPC surface component and bonding it to the substrate component simultaneously; further, if desired, surface coating of the WPC surface component can also be carried out simultaneously.

The hitherto known composite wood materials such as floor board are manufactured by applying a 1–3 mm thick veneer of a high class hard wood such as oak, zelkova, etc. to a substrate by means of a suitable adhesive, and coating the surface of the veneer with urethane or amino alkyd resin coating materials. Such a composite wood board is expensive because it requires complicated manufacturing steps and uses high class hard wood materials; still, its surface coating is not so durable. In contrast, in this invention a thin layer of low cost wood is used instead of a veneer of high cost hard wood for the surface veneer, but the material has the dimensional stability and resistance to abrasion, moisture and oils which are characteristics of WPC, and has all the properties required in a floor material.

In the prior art, WPC is manufactured mainly by impregnating wood material with a vinyl monomer such as methyl methacrylate or styrene and polymerizing said monomer either by heating or by irradiation. However, the resin formed according to such a prior art method is thermoplastic and therefore it can not be surface-polished with a sander and moreover, it is impossible to carry out high speed curing with an electron beam using a higher dose rate.

The WPC which is manufactured in accordance with this embodiment of the invention comprises a cured resin which has been three dimensionally cross-linked, and thus it can be polished with a sander and also has dimensional stability, improved abrasion resistance and resistance to moisture, oils and solvents.

The resin-forming composition suitable for this embodiment of the invention comprises a vinyl monomer solution of diallylphthalate prepolymer, but another reactive prepolymer such as unsaturated polyester can advantageously be added. As to the vinyl monomer, in view of its solvent power for prepolymers and the physical properties of the obtained resin, acrylonitrile is preferable, but, if necessary, other monomers can be used in addition to acrylonitrile which is the main solvent monomer. In order to accelerate the curing reaction, a radical catalyst such as benzoyl peroxide can be advantageously be added in an amount not more than 4%, preferably 0.5–1% by weight whole composition. Though there is no strict limitation on the mixing ratio of the prepolymer and the monomer, in the light of the reaction velocity and ease or impregnation, the preferred ratio is around 50:50.

Impregnation can easily be performed by the conventional methods (vacuum impregnation, pressure impregnation or a combination thereof). The curing of the resin composition can be carried out by means of any of ionizing radiation such as gamma radiation, X-rays and electron beam, however, use of an electron beam is advantageous since it makes continuous manufacturing possible. Needless to say, the electron beam must be strong enough to penetrate the veneer and the resin layer thereunder. This is the most important feature of this invention. It is the penetration of both veneer and resin layer that makes it possible to manufacture a novel plywood material suitable for floor, wall, siding cabinets, etc. in one step. That is, in this invention, a veneer impregnated with the above-mentioned resin-forming composition is pressed against the surface of a substrate board and the thus formed composite is passed, while under slight pressure, through the electron beam, whereby the resin-forming composition acts as the adhesive, too. Further, if it is desired to coat the surface of the veneer, this is easily achieved in the same step by applying a suitable mold-release film or sheet e.g. of Mylar (RTM) on the resin-forming composition remaining on the surface of the veneer upon impregnation, stretching said sheet well to expel bubbles, then passing the composite through electron beam. In this case, there is, of course, no need for a polishing step. Various surface effects are achieved by controlling the amount of the resin-forming composition remaining on the surface of the veneer, or by using pattern-embossed mold release sheets.

An electron beam dose of 2 to 10 Mrad is required for curing the composition, and the preferred dose is about 4 to 8 Mrad. A dose of 6 Mrad will effect more than 90% and a dose of 8 Mrad about 100% conversion of monomer. In this embodiment, a Van de Graaf electron accelerator is used at 1.5 MeV and 100μA. In case gamma rays from Co-60 at the dose rate of 0.1 Mrad/hour are employed, more than 90% conversion of monomer is achieved with a dose of 0.1 Mrad and about 100% with a dose of 0.2 Mrad.

C. According to still another embodiment of this invention, a novel composition which is an improvement of the embodiment (A) is provided as an excellent coating materials. This embodiment is characterized in that a phosphate having a reactive vinyl group or groups (hereinafter referred to as a reactive vinyl phosphate) is added to the composition of this invention, in order to improve adhesive properties and incorporate excellent anticorrosive properties without any adverse effect on the curing of the composition.

The reactive vinyl phosphates incorporated in this composition form of copolymer by reacting mainly with a vinyl monomer and with diallylphthalate prepolymer. This composition improves the bonding and anticorrosive properties when coated for example on an iron surface, presumably owing to formation of complex bonds between the phosphoric acid residue and the iron surface. Furthermore, according to this embodiment, a stable coating the bonding property of which is kept unchanged for long time is obtained, since the vinyl phosphate added to the composition reacts with the coating vehicle by way of copolymerization. The reactive vinyl phosphate is of the type in which the vinyl group of the phosphate either bonds directly with phosphor atom or indirectly with it holding oxygen atom etc. between them. As the type of ester of phosphoric acid, monoester or diester is usually employed and triester can also be used. The vinyl phosphates which are employed in this embodiment typically include a phosphate of a hydroxyalkylmethacrylate, a phosphate of a hydroxyalkyl-acrylate, a vinyl phosphonate, etc.

The paint prepared according to this embodiment is provided with sufficient anticorrosive property by adding an ordinary inert pigment, whereas most of the conventional anticorrosive paints contain the basic anticorrosive pigments such as zinc chromate and basic lead chromate etc. The above-mentioned characteristic is due to the excellent electrical resistance of a paint vehicle containing diallylphthalate prepolymer as well as the effect of a vinyl phosphate additive.

The coating composition of this invention comprises a resinous solution in which about 30 to 70 parts (preferably 40 to 60 parts) of diallylphthalate prepolymer are dissolved in about 70 to 30 parts (preferably 60 to 40 parts) of a mixture substantially consisting of acrylonitrile and at least one alkylacrylate, together with a reactive vinyl phosphate (generally 0.005–0.05 mol per 100g of the monomer mixture), if desired being incorporated with a radical polymerization catalyst. If desired, a pigment can be formulated by milling with the coating composition.

As disclosed in the explanation of the embodiment (A), the increase in acrylonitrile component enhances hardness and solvent resistance of the cured coatings, and as the carbon number of alkyl group of alkyl acrylate increases, the cured coating becomes flexible. The coating composition is further characterized in that it can be cured in an extremely short period of the second unit by means of an electron beam of high dose rate from a low voltage and high amperage accelerator.

The composition of this embodiment was coated on polished mild steel plates and cured by means of an ionizing radiation under nitrogen flow. It was then tested by cross-cut adhesion test, Erichsen test, impact test, immersion test in aqueous sodium chloride solution and immersion test in toluene or xylene etc. These tests prove that the cured coatings obtained after applying the coating composition are suitable as an anticorrosive primer for ships. A coating material employed as a primer must serve as a suitable base for a topcoat. The cured coatings prepared as above were top-coated with oil, chlorinated rubber, vinyl resin, epoxy resin and tar-epoxy resin series paints respectively. The above-mentioned tests were carried out on these top-coated samples, and no defect such as peeling between the coated layers was found.

One of the characteristics of this invention is that no solvent is required in this coating composition. However, when it is necessary to decrease the viscosity of the composition for particular applications, a highly volatile low-boiling organic solvent such as acetone etc., which evaporates rapidly and does not prevent polymerization reaction, can be added to this coating composition. The use of such solvent has substantially no adverse effect on the curing of the coated composition.

BRIEF DESCRIPTION OF THE DRAWING

The attached drawing illustrates the conversions of monomers when some of the resin-forming compositions of the present invention are cured.

DESCRIPTION OF THE PREFERRED EMBODIMENTS

Now the invention is illustrated by way of working examples. In these examples, the amount of the components is shown by weight.

EXAMPLE 1

A resin-forming composition was obtained by dissolving 100 parts by weight of diallylphthalate prepolymer (iodine value 56, softening point 80°–95°C, the same prepolymer being employed in Examples 1–6) and four parts by weight of commercially available benzoyl peroxide in a mixture of 60 parts by weight of commercially available acrylonitrile and 20 parts by weight of commercially available methylacrylate to give a homogeneous mixture. This composition was poured on the surface of a plywood board laminated with printed paper at the rate of 180g/m². The coated surface was covered with a mold release sheet, which was pressed and stretched well to expel bubbles. The composite was subjected to electron beam irradiation of 6 Mrad from a Van de Graaff electron accelerator (1.5 Mev. 100μA, 0.5 Mrad/sec). A stable and durable decorative surface coating was beautiful lustre was obtained. The obtained product passed all the tests carried out in accordance with JAS and JIS. The tests include Test for Resistance to Chemicals (passed tests with 5% acetic acid, 1 % sodium carbonate solution, methanol, toluene, acetone, carbon tetrachloride, chloroform); Repeated Heating and Cooling Test (A cycle of heating at 100°C for 2 hours and cooling at −20°C for 2 hours was repeated 5 times, and no change was observed.); Soiling Test (passed test with mercurochrome and black shoe polish, slightly stained with iodine tincture); Test against Cigarette (passed); Test of Machinability with Electric Saw (passed).

EXAMPLE 2

A resin-forming composition was prepared by dissolving 100 parts by weight of diallylphthalate prepolymer (the same as that of Example 1 and three parts of benzoyl peroxide in 100 parts by weight of acrylonitrile to give a homogeneous mixture. Example 1 was repeated using this composition. A durable and beautiful decorative coating with lustre was obtained by electron beam irradiation of 5 Mrad.

EXAMPLE 3

A resin-forming composition was prepared by dissolving 100 parts by weight of diallylphthalate prepolymer (the same as that of Example 1 and four parts by weight of benzoyl peroxide in a mixture of 90 parts by weight of commercially available butylacrylate and 10 parts by weight of acrylonitrile to give a homogeneous mixture. This composition was applied on a surface of a steel plate (JIS G 3310, 0.5 × 50 × 150 mm) which had been degreased with toluene and polished with sand paper (No. 120), and the coated surface of about 30μ in thickness was covered by the mold release sheet which was stretched to expel bubbles as in Example 1. By electron beam irradiation of 5 Mrad of clear coating with lustre was obtained on the metal surface. The coated steel plate was subjected to the following tests at 20°C and 75% humidity.

Bending test: The plate was bent at an angle of 180° around an axis of 2 mm in diameter with the coated surface outside. The coating was not damaged.

Drawing test: A circle 10 mm in diameter was drawn with a total load of 400g, the coating did not suffer any peel-off.

Cross-out Adhesion Test: 100/100

Impact Test: The results of the test by means of the Impact Test by Dupont type method; (Load: 1 Kg. Fall: 50 cm, Diameter of hammer: one-half inch) no observable damage to the coating.

EXAMPLE 4

A resin-forming composition was prepared by dissolving 100 parts by weight of diallylphthalate prepolymer (the same as that in Example 1) and four parts by weight of benzoyl peroxide in a mixture of 90 parts by weight of commercially available ethylacrylate and 10 parts by weight of acrylonitrile to give a homogeneous mixture. This composition was applied on the surface of a steel plate and given electron beam irradiation of 4 Mrad in accordance with the operation of Example 3. A clear coating with lustre was formed on the metal surface.

EXAMPLE 5

A resin-forming composition was prepared by dissolving 100 parts by weight of diallylphthalate prepolymer (the same as that in Example 1) and 0.5 part by weight of benzoyl peroxide in a mixture of 90 parts by weight of acrylonitrile and 100 parts by weight of methylacrylate to give a homogeneous mixture. A piece of beech wood 80 × 30 × 8 mm in dimension was impregnated with the composition of vacuo for 4 hours (84% impregnation). The piece was covered with aluminium foil and was subjected to electron beam irradiation of 4 Mrad. Conversion of monomers as 93%. When it was subjected to irradiation of 6 Mrad, conversion was 98%, which is almost complete curing.

On the other hand, the composition comprising 100 parts by weight of diallylphthalate prepolymer, 0.5 parts by weight of benzoyl peroxide dissolved in 100 parts by weight of acrylonitrile achieved only 88% conversion when impregnation of wood was effected as above (85% impregnation) and was given electron beam irradiation of 4 Mrad.

EXAMPLE 6

A resin-forming composition was prepared by dissolving 50 parts by weight of diallylphthalate prepolymer (the same as that in Example 1) in a mixture of 45 parts by weight of acrylonitrile and 5 parts by weight of methylacrylate to give a homogeneous mixture. The composition was coated on the surface of a steel plate and given electron beam irradiation of 4 Mrad in accordance with the operation of Example 3. the conversion of monomers was 67.2%. When the composition prepared by adding four parts by weight of benzoyl peroxide to the above resin-forming composition was employed, a remarkably higher conversion of 91.5% was achieved.

EXAMPLE 7

A 1 × 50 × 50 mm piece of birch-tree board was degassed by placing it in a desiccator at the reduced pressure of 1 mmHg for 1 hour, and was impregnated with the resin-forming composition consisting of 50 weight parts of diallylphthalate prepolymer, 50 weight parts of acrylonitrile and 1 weight part of benzoyl peroxide, by dipping it in the composition for 3 hours. The birch-tree board impregnated with the composition was laminated with a 5 × 5 cm veneer board 4mm thick. The laminated sample was covered with a Mylar moldrelease sheet and bubbles were removed by stretching the sheet; then the sample was given 6 Mrad of electron beam irradiation. An electron beam at the dose rate of 1.5 Mrad/sec was applied using a Van de Graaff electron accelerator.

When force was applied in an effort to peel-off the bonded layer, cracks were produced in the veneer board rather than in the bonded surface. A beautiful and durable surface with lustre was obtained after removing the mold-release sheet. The resulting surface was not affected at all by the solvent-proof test which comprises contacting for 15 minutes at room temperature absorbent cottons impregnated with water, ethyl alcohol, acetone, chloroform, ethyl acetate, etc. respectively.

EXAMPLE 8

A 1 × 50 × 50 mm piece of birch-tree board was impregnated with the resin-forming composition in the same way as Example 7. The impregnated sample was placed on a substrate and the composition remaining on the surface was wiped off. Then the sample was irradiated with 6 Mrad of electron beam and cured. After curing, a beautiful surface of wood-polymer composite was obtained by polishing the cured resin surface.

EXAMPLE 9

Five 1 × +× 30 mm pieces of birch-tree board were impregnated with the resin-forming composition in the same way as Example 7, covered with aluminium foil and irradiated with electron beams of 2, 4, 6, 8 and 10 Mrad respectively. The unreacted monomers were evaporated by keeping the cured samples at the temperature of 50°C and at the reduced pressure of 1 mmHg for 2 days. Curve line A of the attached drawing shows conversions of the monomers which were calculated from the weight changes of the samples.

EXAMPLE 10

Five 1 × 30 × 33 mm pieces of birch-tree board were impregnated with the resin-forming composition consisting of 50 weight parts of diallylphthalate prepolymer and 50 weight parts of acrylonitrile in the same way as Example 7. The impregnated samples were irradiated with electron beams of 2, 4, 6, 8 and 10 Mrad respectively. The unreacted monomers were evaporated by keeping the cured samples at 50°c and under the pressure of 1 mmHg for 2 days. Curve line B shows conversions of the monomers.

EXAMPLE 11

A 3 × 30 × 30 mm piece of beech board was impregnated with the resin-forming composition consisting of 50 weight parts of diallylphthalate prepolymer and 50 weight parts of acrylonitrile in the same way as Example 7. The impregnated sample was given electron beams irradiation of 8 Mrad and cured. The following table compares dimensional changes in the sample and an untreated beech board. The test was carried out by drying the two specimens at a temperature of 50°C and at a reduced pressure of 1 mmHg for 5 days and then placing the specimens in a thermo-hygrostat kept at relative humidity of 90% and at 40°C for one month. The dimensions of a completely dry board in vacuum were used as a standard and dimensional difference with respect to the standard were measured. The excellent results confirm high dimensional stability achieved by use of the present invention.

Table 1

|  | Untreated Board | Treated Board |
|---|---|---|
| Ratio of resin impregnated(%) | 0 | 108 |
| Increase in weight (%) | 17.7 | 5.2 |
| Increase in dimensions |  |  |
| Tangential direction (%) | 6.1 | 2.0 |
| Radial direction (%) | 2.7 | 1.3 |
| Axial direction (%) | 0.9 | 0.2 |

EXAMPLE 12

Example 11 was repeated using electron beam irradiation of 4 and 6 Mrad respectively. The dimensional changes were measured in the same way as Example 11.

Table 2

|  | Sample irradiated with 4 Mrad dose | Sample irradiated with 6 Mrad dose |
|---|---|---|
| Ratio of resin impregnated (%) | 75.6 | 102.6 |
| Increase in weight (%) | 7.4 | 5.5 |
| Increase in dimensions |  |  |
| Tangential direction (%) | 3.0 | 2.4 |
| Radial direction (%) | 2.1 | 1.6 |
| Axial direction (%) | 0.2 | 0.2 |

EXAMPLE 13

Hardness test and abrasion test were carried out on the plywoods obtained by the present invention. The results are shown in Table 3. The abrasion test was done according to "the method of testing thermosetting plastics decorative laminate plywood" of JIS (Japanese Industrial Standards) K-6902; however, the depth of abrasion per 300 rotations was used as the basis for evaluation, since the method used for decorative laminate plywood can not be applied to these plywoods. The samples were prepared by impregnating 1 × 120 × 120 mm birch boards with the resin-forming solution consisting of 50 weight parts of diallylphthalate prepolymer, 50 weight parts of acrylonitrile and 1 weight part of benzoyl peroxide at the impregnation of about 100%, laminating the boards with substrates and irradiating the laminated materials with 6 Mrad of electron beam.

Table 3

|  | Birch Board untreated | Plywood with WPC WPC surface | Plywood with WPC surface coated with the cured resin |
| --- | --- | --- | --- |
| Barcol Hardness | "unmeasurable" | 30 – 35 | 35 – 40 |
| Durometer D Hardness | 60 – 65 | 70– 75 | 75 – 80 |
| Depth of Abrasion (mm/300 Rotations) | 0.215 | 0.132 | 0.152 |

EXAMPLE 14

A coating compound was prepared by dissolving 50 parts of diallylphthalate prepolymer (iodine value 56, softening point 90–95°C; hereinafter the same prepolymer is employed), 40 parts of n-butylacrylate, 10 parts of acrylonitrile and three parts of phosphate of 2-hydroxy-ethyl-methacrylate (monoester about 80%, diester about 20%, hereinafter the same phosphate is used except for Example 20), formulating 15 parts of black iron oxide pigment by means of a ball mill for 24 hours, and adding two parts of benzoyl peroxide.

A coating 30µ thick was applied to the surface of 70 × 150 × 0.8 mm mild steel plates (JIS-G-3310) with a bar coater. The thus coated plates were given 6 Mrad of electron beam irradiation under nitrogen atmosphere from a Van de graaff type accelerator (1.5 MV and 100µ A). Excellent results were obtained in the various tests made on the cured coatings as shown below.

Cross-Cut Adhesion Test:

The cured coating was cross-cut into 100 pieces of 1 mm squares by the steel needle for gramophone. A cellophane tape was put thereon, and then pulled off at an angle of 45° against the coating surface. None of the coating peeled off.

Impact Test:

Neither peeling nor cracking was exhibited under the DuPont type testing load 1 Kg, diameter of hammer one-half inch, 50 cm fall).

Immersion Test in aqueous NaCl solution:

Formation of rusts and blisters was exhibited after being immersed for 5 days in a 3% aqueous NaCl solution at 20°C.

Xylene Immersion Test: After being immersed in xylene for 5 days at 20°C, neither blistering nor peeling occurred, although a trace of swelling was exhibited.

EXAMPLE 15

Samples coated in the same way as Example 14 were irradiated in air with 6 Mrad of an electron beam. The same tests were made on the cured samples at the same results as in Example 14 were attained exept that the coating immersed in the aqueous NaCl solution became brittle to some extent.

EXAMPLE 16

A coating composition was prepared by dissolving 50 parts of diallylphthalate prepolymer, 40 parts of ethylacrylate, 10 parts of acrylonitrile and 5 parts of phosphate of 2-hydroxyethyl methacrylate, formulating 20 parts of red iron oxide pigment by means of a ball mill for 24 hours, and adding two parts of benzoyl peroxide. Example 14 was repeated by using thus prepared composition. The cured coating was substantially equal to that of Example 14.

EXAMPLE 17

A coating composition was prepared by dissolving 50 parts of diallylphthalate prepolymer, 40 parts of n-butylacrylate, 10 parts of acrylonitrile and five parts of phosphate of 2-hydroxyethyl methacrylate, formulating 15 parts of titanium dioxide pigment by means of a ball mill for 24 hours, and adding two parts of benzoyl peroxide. Example 14 was repeated by using thus prepared composition. The tests showed that the cured coating was by no means inferior to that of Example 14.

EXAMPLE 18

A clear transparent coating composition was prepared by dissolving 50 parts of diallylphthalate prepolymer in a mixture of 40 parts of n-butyl acrylate, 10 parts of acrylonitrile, three parts of phosphate of 2-hydroxyethylmethacrylate and two parts of benzoyl peroxide.

The composition was coated with a bar coater on polished mild steel plates in the same way as Example 14, followed by electron beam irradiation of 6 Mrad in the air. The same tests were carried out on the cured samples, which were found to have excellent properties.

EXAMPLE 19

The same composition was prepared in Example 18 was coated with a bar coater on polished mild steel plates, followed by electron beam irradiation of 6 Mrad in the air. The cured samples were left for 1 day at a room temperature, then uniformly overcoated with a polyvinyl chloride anticorrosive paint with a paint brush, and dried for 1 day at room temperature.

The cross-cut adhesion test and impact test were carried out on the top-coated samples in the same way as Example 14. No coating was removed by the cross-cut adhesion test. The impact test caused no peeling between the coated layers and no cracking.

EXAMPLE 20

A coating composition was prepared by dissolving 50 parts of diallylphthalate prepolymer, 40 parts of n-butylacrylate, 10 parts of acrylonitrile and two parts of vinylphosphate

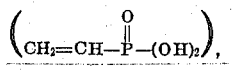

formulating 15 parts of black iron oxide pigment by means of a ball mill for 24 hours, and adding two parts of benzoyl peroxide. The composition was coated, cured and tested in the same way as in Example 14. The tests showed that the cured coating is by no means inferior to that of Example 14.

CONTROL (REFERENCE EXAMPLE)

Example 14 was repeated except that no phosphate of 2-hydroxyethyl methacrylate was added to the composition. The cross-cut adhesion test showed the residue ratio of 20–50 per 100 cross-cuts. The cured coating exhibited blistering and formation of rust in the immersion test with aqueous NaCl solution, and some peeling of the coating in the xylene immersion test.

What is claimed is:

1. A method of preparing a wood-polymer composite, comprising: impregnating a thin wooden board with a resin-forming composition comprising diallyl phthalate prepolymer and acrylonitrile in an amount sufficient to dissolve the diallyl phthalate prepolymer to give a uniform solution thereof, and curing the resin-forming composition by exposing said composition by ionizing radiation; thereby forming a wood-polymer composite consisting essentially of a highly-cured, cross-linked diallyl phthalate polymer which is intimately united with said wooden board.

2. The method of claim 1, wherein the resin-forming composition additionally comprises a free-radical polymerization initiator.

3. The method of claim 1, wherein the resin-forming composition additionally comprises a polymerizable vinyl monomer in addition to acrylonitrile.

4. The method of claim 1, wherein the resin-forming composition is exposed to ionizing radiation by exposing said composition with an electron beam.

5. A method of preparing a wood-polymer composite plywood having a plurality of layers, comprising: impregnating at least one of plurality of thin wooden boards with a resin-forming composition comprising diallyl phthalate prepolymer and acrylonitrile in an amount sufficient to dissolve the diallyl phthalate prepolymer to give a uniform solution thereof; laminating the plurality of boards together; and curing said composition and simultaneously adhering said plurality of boards together by exposing said resin-forming composition to ionizing radiation; thereby forming a wood-polymer composite plywood consisting essentially of a highly-cured, cross-linked diallyl phthalate polymer which is intimately united with said wooden boards.

6. A method of preparing a wood polymer composite and a substrate, comprising: impregnating a thin wooden board with a resin-forming composition comprising diallyl phthalate prepolymer and acrylonitrile in an amount sufficient to dissolve the diallyl phthalate prepolymer to give a uniform solution thereof; laminating the impregnated board with a substrate; and curing said composition and simultaneously adhering said board to said substrate by exposing said resin-forming composition to ionizing radiation; thereby forming a wood-polymer composite plywood consisting essentially of a highly-cured, cross-linked diallyl phthalate polymer which is intimately united with said wooden boards.

7. The method of claim 6, wherein the resin-forming composition additionally comprises a polymerizable vinyl monomer in addition to acrylonitrile.

8. The method of claim 6, wherein the resin-forming composition additionally comprises a polymerizable ethylenically-unsaturated polyester.

9. The method of claim 6, wherein a mold-release sheet is in contact with the surface of the impregnated wooden board during exposure to ionizing radiation.

10. The method of claim 6, wherein the resin-forming composition is exposed to ionizing radiation by exposing said composition with an electron beam.

11. A wood-polymer composite plywood consisting essentially of a plurality of laminated thin wooden layers, at least one of the thin layers being impregnated with an ionizing radiation cured, cross-linked diallyl phthalate-acrylonitrile polymer; said cured polymer being intimately united with said wooden layers.

12. A plywood comprising a wood-polymer composite and a substrate, wherein said wood-polymer composite comprises a thin wooden board impregnated with an ionizing radiation cured, cross-linked diallyl phthalate-acrylonitrile polymer, and said board is laminated to said substrate by said cured polymer.

* * * * *